Nov. 19, 1968  J. E. CORDNER  3,412,230
WELDING SYSTEM
Filed April 29, 1965  2 Sheets-Sheet 1
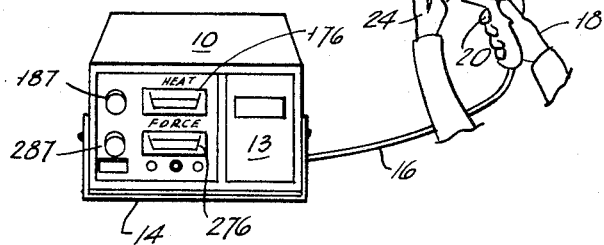
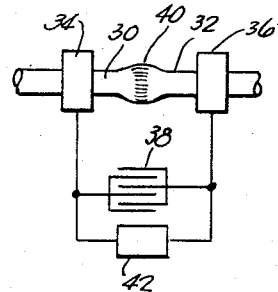
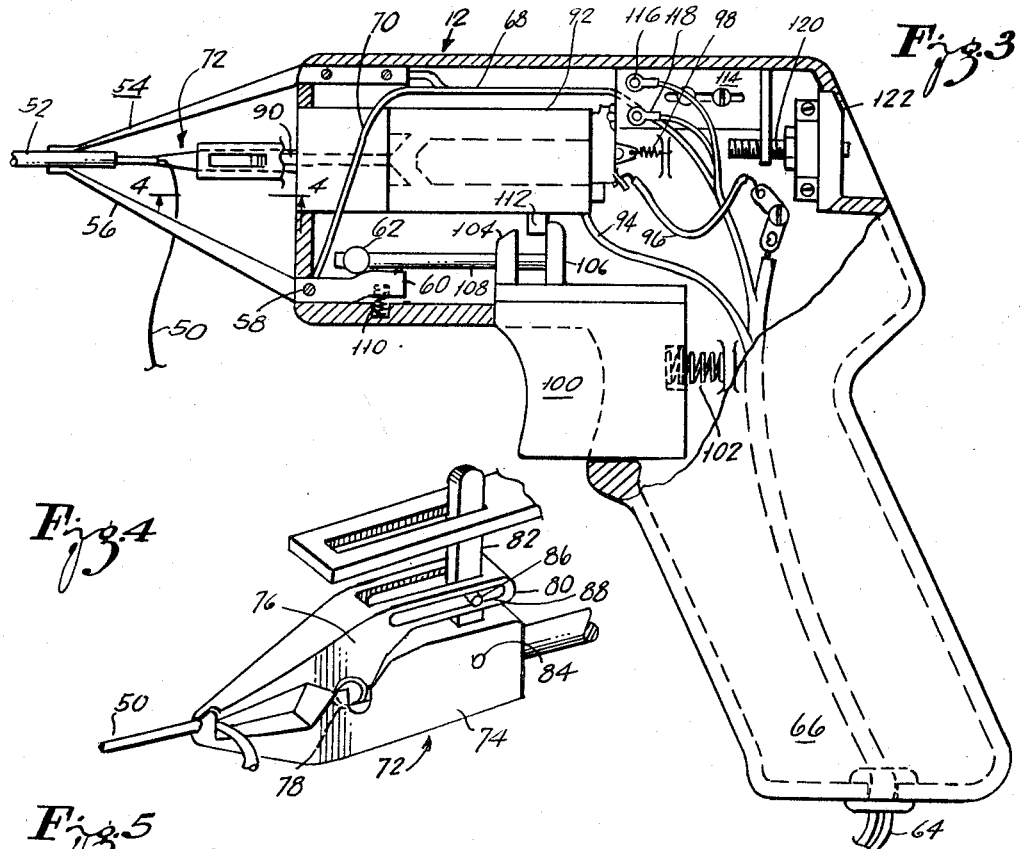
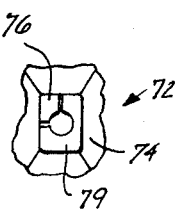
INVENTOR.
James E. Cordner
Smyth, Roston & Pavitt
Attorneys

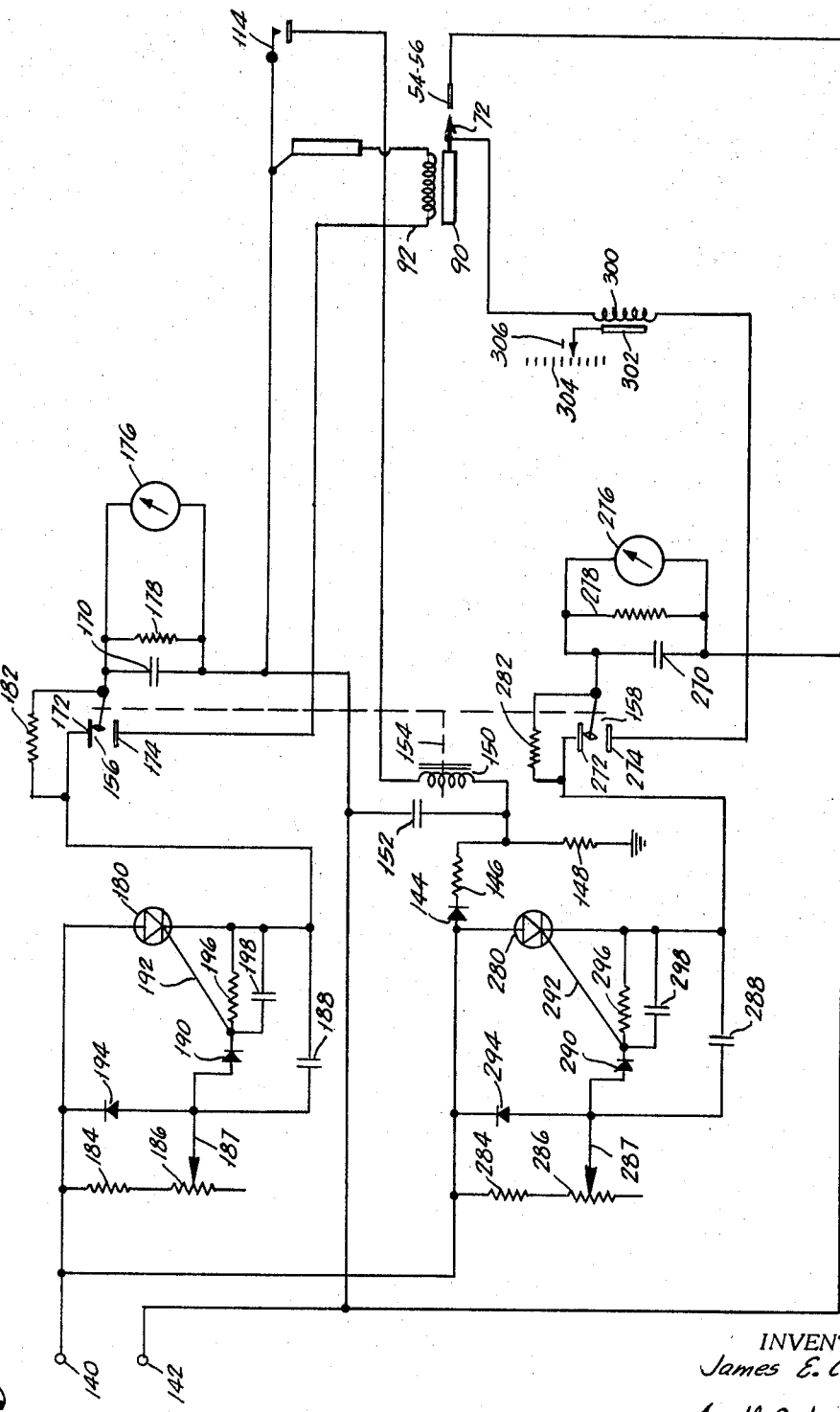

United States Patent Office 3,412,230
Patented Nov. 19, 1968

3,412,230
WELDING SYSTEM
James Ernest Cordner, San Grabiel, Calif., assignor to Matrix Science Corporation, Burbank, Calif., a corporation of Delaware
Filed Apr. 29, 1965, Ser. No. 451,768
10 Claims. (Cl. 219—95)

ABSTRACT OF THE DISCLOSURE

This disclosure relates to electrical welding systems of the resistance type. The disclosure involves improved electronic circuitry which gives lcose control of percussion timing and pressure and close regulation of welding current as well. The weld circuit includes a monitoring gauge which enables the operator to adjust the welding time.

---

This invention relates in general to electrical welding systems of the resistance type and more particularly to an electrical resistance welding system adapted for the performance of percussive welding.

Resistance welding is a process wherein two or more metal parts are welded together by the combined use of heat and pressure, the heat being generated by a relatively short-time flow of low-voltage, high-amperage electrical current across the weld point and pressure being applied by pressing the current-carrying electrodes together with the workpieces between. Resistance welding has the advantage that no filler metal is used and that the weld is, therefore, created directly between the parts being joined. The best known sub-type of resistance welding is spot welding, which is probably the easiest and most inexpensive mass production welding method yet developed. The main concern of the instant invention, however, is percussive or percussion welding, which is the exclusively preferred method of joining fine wires to busses and terminals, of welding stranded conductors to solid conductors, of welding exotic materials, and of making high temperature terminations.

Percussion welds prove far superior to welds produced by other methods with regard to chemical, structural and physical characteristics. Heating is largely confined to very small areas and, accordingly, workpieces are not discolored or warped to any great extent. Moreover, percussion welding makes it possible to join many similar and dissimilar metals and to manufacture parts at speeds unequaled by any other welding methods. To be successful, however, percussion welding requires a closely coordinated application of a proper magnitude and duration of current, together with a properly timed application of pressure.

Present percussion welding machines have used line power to charge a bank of capacitors. Once the capacitors are charged, their terminals are switched into connection with two sets of electrodes which clamp the workpieces to be welded. One of the workpieces is then propelled towards the other, and at a given arcing distance determined by the voltage to which the capacitors are charged, the capacitors discharge themselves, generating an intense welding heat. By the time the two pieces actually come in contact, the discharge is completed and the two pieces are sufficiently heated to become forged together.

One of the most important features of the welding system according to the instant invention is its improved electronic circuitry which gives closer control of percussion timing and pressure and closer regulation of welding current as well. In the welding system herein disclosed, percussive motion is created by a solenoid having its movable armature connected to actuate one of the material-holding electrodes. The current for the solenoid is supplied from a solenoid charge-storage capacitor which, according to the invention, is charged, during the "off" time of the solenoid circuit, by a closely regulatable and almost instantaneous-acting charging circuit. Similarly, the capacitor which accumulates charge for supplying to the electrodes as welding current has another and entirely separate highly regulatable instantaneous charge circuit. The welding system also includes a circuit for instantaneously recharging the capacitor for operating the solenoid and the capacitor for producing the weld after the capacitors have been discharged.

As another feature of the invention, the weld circuit includes a monitoring gauge which enables the operator of the welding system to adjust the weld circuit charge-storage capacitor more accurately than was heretofore possible. All in all, the improved electronics of applicant's new welding system are such an advance over what was previously known that the system is able to percussion weld more and different materials and material sizes than was heretofore thought possible. For example, welding copper-to-tungsten can be accomplished reliably for the first time because sufficient weld energy can be generated without speeding the forging action to a point where the hot metals splatter upon impact. Moreover, applicant's electronic system has eliminated the need for using radio frequency signals in order to achieve ionization of the weld gap, with the result that the system does not require the heavy, costly radio frequency transformers and components that used to fill an entire cabinet at every percussion welding work station. Rather, the welding system of the instant invention has an overall weight of only 10 pounds and is packaged in a small portable carrying case.

An equally important accomplishment of the new welding electronics is the decrease in sensitivity of the welding system to the initial gap setting between workpieces prior to the percussion actuation. This fact not only decreases the amount of operator skill required to use applicant's new welder, but also speeds up the chucking of workpieces in the holders of the welding gun and thus increases the production rates possible because of applicant's new welding system. Another accomplishment of applicant's new electronic system is the increase in accuracy of welding by the use of linear rather than step-switch adjustment of both weld energy and percussion energy.

Other features of applicant's new welding system relates to the gun-shaped hand tool (hereinafter called "gun") with which an operator first clamps wire and a contact to which the wire is to be percussion welded and then triggers the welding sequence. Applicant's new gun features a triggering mechanism which in one continuous motion causes a workpiece to be gripped, the percussion solenoid to be actuated, and the weld current to be applied to the electrode. Another feature of the gun is an improved jaw design for gripping the wire to be percussion welded to the workpiece, whereby placement and advancement of the wire is made much less time-consuming. Another feature of the gun is an adjustment device which gives very fine control of separation distance of workpieces immediately before actuation of the percussion solenoid.

Other objects and features of applicant's invention and a fuller understanding thereof may be had by referring to the following description and claims taken in conjunction with the accompanying drawings, in which:

FIGURE 1 is a sketch of a percussion welding system according to the instant invention as it would appear in operation;

FIGURE 2 is a schematic view of a generalized system for the performance of percussion welding;

FIGURE 3 is a side elevation in cutaway of a gun according to the principles of the instant invention;

FIGURE 4 is a side elevation of an improved wire-holding jaw arrangement according to the principles of the instant invention;

FIGURE 5 is an enlarged view of the wire-holding jaws taken along section line 4—4; and FIGURE 6 is a schematic view of an electronic system for the performance of percussion welding according to the principles of applicant's invention.

Referring to FIGURE 1, a percussion welding system in which the principles of the instant invention may be embodied has a power supply 10 and a hand tool or gun 12. When not in use, the gun 12 may be stored in a compartment behind a door 13. The power supply 10 according to the instant invention is so light and compact that it is easily portable, using a handle 14 for carrying. The power supply 10 is connected to the hand gun 12 by an electrical cable 16. In the practice of percussion welding using the system of FIGURE 1, an operator grasps the gun 12 with a first hand 18 having its index finger 20 on the gun trigger and holds a workpiece 22 in his second hand 24. In this position, the percussion weld sequence is triggered and the weld is performed. Unlike many prior art welders, the power supply 10 is capable of using standard 110-volts, sixty cycles per second wall socket power.

Referring to FIGURE 2, a schematic diagram of the welding system of FIGURE 1 shows a first workpiece 30 and a second workpiece 32 held by a first electrode 34 and second electrode 36, respectively. Prior to fusing of the workpieces 30 and 32, a difference in electrical potential is created therein by the electrical connection of the electrodes 34 and 36 across opposite terminals of a charge-storage capacitor 38. When the charge-storage capacitor 38 is properly charged for welding to occur, one of the electrodes 34 or 36 is caused to move towards the other, and its workpiece with it. As the workpieces 30 and 32 approach each other, the difference in electrical potential across them causes an arc to occur at a particular distance between the workpieces and great heat to be generated due to electrical resistance at the arcing points. This heat melts the metal of the workpieces 30 and 32 just prior to percussive impact of the workpieces 30 and 32 against each other at a point 40, where the melted metal of each workpiece 30 and 32 fuses with the metal of the other to join the workpieces in a percussive weld.

Sometime prior to this welding sequence, a control circuit 42 in the power supply 10 charges up the capacitor 38. Very careful regulation of the magnitude of this charge as well as the percussive movement of the electrodes 34 and 36 determines the exact nature of the weld which will be produced.

Referring to FIGURE 3, the gun 12 according to the principles of applicant's invention is adapted for attaching wire 50 of a very fine texture to a larger workpiece 52, such as the terminal or contact of an electrical connector. The large workpiece 52 is held by a stationary gripper or electrode 54 and a movable gripper or electrode 56 which is pivoted at 58 and moved toward the stationary gripper 54 by the interaction of a cam 60 at its inner end with a cam roller 62. Of the wiring 64 entering the gun of FIGURE 3 at a point at the bottom of its handle 66, one weld lead 68 is electrically connected both to the fixed gripper 54 and by a jumper 70 to the movable gripper 56 in order to assure that the necessary percussion welding charge is imposed upon the workpiece 52.

The wire 50 is held by a wire holder 72, also shown in detail in FIGURES 4 and 5. The wire holder 72 has a fixed jaw 74 and a movable jaw 76 mounted rotatably to the fixed jaw 74 by a bearing 78. The movable jaw 76 is opened and closed relative to the fixed jaw 74 by force applied to a shank 80 by a latch 82 pivoted at 84 and having a pin 86 which rides in a slot 88 in the shank 80 as the latch 82 is moved backwards and forwards. As a feature of the invention contributing to ease of wire threading and thus to manufacturing speed, the surfaces of the jaws 74 and 76 that contact the wire 50 are shaped as shown in FIGURE 5 so that the wire can lie in the trough 79 without being held by the operator, so that his free hand can be used to manipulate the latch 82 without the need of putting down the gun.

The wire holder of FIGURE 4 is mounted on an armature shaft 90 associated with a percussion solenoid 92 mounted in the body of the gun. The windings of the solenoid 92 are in circuit with other electrical elements to be described below and are connected thereto through wires 96 passing from the hand gun to the power supply 10. A wire 94 connected to the armature 90 imposes a percussion welding charge on the wire holder 72. A spring 98 holds the armature 90 back toward the rear of the gun until such time as energization of the solenoid 92 causes the armature 90 to jump forward.

A trigger 100 provides for actuation of the welding system by the operator of the gun. The trigger 100 is urged outward or forward toward the front of the gun by a spring 102 and has ears 104 and 106 as well as a cam shaft 108 attached at the top. When the trigger 100 is pulled back by the operator of the gun, the cam shaft 108 pulls back the cam roller 62 over the cam 60 on the lower gripper 56, causing the lower gripper to rotate about its pivot 58 against the urging of a spring 110 which keeps the gripper 56 in a normally opened position. Movement of the trigger 100 forward or backward causes one of the ears 104, 106 to contact a detent 112 mounted on the solenoid assembly 92. When the trigger 100 is pulled back and the ear 104 pushes the solenoid assembly 92 back, in effect "cocking" the gun, after travelling a certain distance the solenoid assembly 92 comes into contact with a microswitch 114 having electrical leads 116 and 118 which carry a signal back to the power supply 10 and the electronics therein. When the microswitch 114 is activated by contact with the solenoid 92, the welding sequence is initiated. The distance of travel of the solenoid assembly 92 under urging from the trigger ear 104 before it trips the microswitch 114 is adjustable by a screw 120 rotatable by a wheel 122 at the back of the gun to move the microswitch 114 closer to or far back from the resting point of the solenoid assembly 92 in its pre-triggering condition.

Referring to FIGURES 1 and 4, as another feature of applicant's invention whereby the hand gun shown in FIGURE 3 can be made even more quickly loadable, thereby increasing the manufacturing speed achievable using it, a slide 130 has been mounted on the left hand side of the hand gun 12 where the right hand thumb of the operator of the gun can move it back and forth while the operator's right hand is holding the gun 12 in proper position for welding. The front part of the slide 130 has a slot 132 in which the latch 82 rides. When the operator pushes the slide 130 forward, the rear end of the slot 132 engages the latch 82 and pushes it forward to cause the movable jaw 76 to open so that wire 50 can be properly positioned therebetween. Once the wire 50 is properly positioned, the operator of the gun pulls the slide 130 back until the forward end of the slot 132 engages the latch 82 and pulls it backward, thereby closing the movable jaw 76 against the fixed jaw 74. The length of the slot 132 should be made such as to allow the free travel of the solenoid assembly 92 and, therefore, of the jaws 74 and 76 and latch 82 relative to the main body of the gun; for such travel occurs every time the trigger 100 is pulled.

In the performance of percussion welding using the gun of FIGURE 3, an operator holds the gun in his right hand 18 as shown in FIGURE 1 and positions a piece of wire 50 between the jaws 74 and 76. Thereafter, the operator takes the workpiece 22 in his left hand 24 and inserts the contact 52 to which the wire 50 is to be percussion-welded between the grippers 54 and 56. The contact 52 is positioned flat against the wire 50; so that the distance that the wire 50 is drawn back by the movement of the solenoid assembly 92 by the trigger ear 104 is the distance over which the wire 50 is accelerated forward when the welding sequence is initiated. This distance can, of course, be adjusted by use of the adjusting screw 120. The longer the distance is made the more acceleration the wire 50 can be given and the harder the percussive impact.

Once the wire 50 and the workpiece 52 are in proper position for welding, the trigger 100 is pulled back, causing the cam roller 62 to force the movable gripper 56 to clamp the workpiece 52 and the ear 104 to pull the solenoid assembly back until the microswitch 114 is actuated. Upon actuation of the microswitch 114, the electronics of applicant's welding system cause the grippers 54 and 56 to be electrically coupled to one plate of a charge-storage capacitor, while the wire holder 72 is, in effect, coupled to the other plate, causing the electrical potential across the charged capacitor (such as 38 of FIGURE 2) to be imposed between the grippers 54–56 and the wire holder 72. Simultaneously, another charge-storage capacitor is switched to discharge through the solenoid 92, so that the armature 90 is impelled forward. As the wire 50 is thus percussively jammed into contact with the workpiece 52, the capacitor potential between the two elements 50 and 52 arcs across the rapidly closing gap, creating the melting heat referred in the discussion of percussion welding in connection with FIGURE 2. The melted metal of the wire 50 and the workpiece 52 then fuse and cool to form the percussive weld 40 shown in connection with FIGURE 2.

Referring to FIGURE 6, the electronic system in the power supply 10 is adapted to impose a welding potential on the grippers 54 and 56 and on the wire holder 72 and also to deliver a percussion pulse to the windings of the solenoid 92 for impelling the armature 90 and, therefore, the wire holder 72 forward toward the workpiece held by the grippers 54 and 56. The weld sequence is triggered by closure of the microswitch 114. Although the power supply of FIGURE 6 is adapted to operate from any two-terminal power supply such as ordinary house current, the power source is herein represented generally as coming from the terminals 140 and 142. The terminal 142 is directly connected to the grippers 54 and 56 and also to one end of the solenoid 92 and one terminal of the microswitch 114. The first power supply terminal 140 is coupled through a rectifier 144 and voltage division resistors 146 and 148 to the first and of a weld cycle actuation solenoid 150. The second end of the solenoid 150 is directly connected to the microswitch 114. A charge-storage capacitor 152 is coupled in parallel with the series combination of the actuation solenoid 150 and the microswitch 114, so that, when the microswitch 114 is opened, the capacitor 152 will charge through the rectifier 144 and resistor 146. The moment the microswitch 114 is closed, the capacitor 152 will discharge through the solenoid 150 and the microswitch 114 to actuate the armature 154 of the solenoid 150, which throws two switches 156 and 158 associated with percussion current supply and weld current supply, respectively.

The circuitry for supplying current to the hand gun percussion solenoid 92 has the object of placing the proper charge on a percussion solenoid charge-storage capacitor 170, one plate of which is directly coupled to the power supply reference terminal 142 while the other plate is directly coupled to the movable contact of the switch 156. When the movable contact of the switch 156 is switched to a first pole 172, the charge-storage capacitor 170 is charged. When the movable contact of the switch 156 is switched to the pole 174 due to actuation of the solenoid 150, charge from the charge-storage capacitor 170 flows through the percussion solenoid 92 to the reference terminal 142, resulting in the impelling of the wire holder 72 toward the workpiece held in the grippers 54, 56. A voltmeter 176 is connected in parallel with the capacitor 170 in order to facilitate adjustment of the charge stored in the capacitor 170 to the proper level for any particular percussive welding operation. A bleeder resistor 178 is also coupled in parallel with the capacitor 170; the function of the bleeder resistor 178 is to dissipate the charge on the capacitor 170 at certain times in the operating cycle.

As one feature of the instant invention, the capacitor 170 is charged much faster than was possible in the prior art by a silicon-control rectifier (SCR) 180 connected between the input terminal 140 and the pole 172 of the switch 156. A resistor 182 is coupled in parallel with the switch 156 so that even when the movable contact thereof is not closed to the pole 172 some current can flow through the silicon-control rectifier 180, so that it does not turn "off" during the discharge period of the capacitor 170. Gating of the SCR 180 is accomplished by a time constant circuit comprising a fixed resistor 184, a variable resistor 186 (adjusted by a knob 187 on the power supply 10) and a capacitor 188 coupled in series across the SCR. When the SCR 180 is "cut-off" or non-conductive, the capacitor 188 charges through the resistors 184 and 186, at a rate variable by varying the position of the slide 187 on the variable resistor 186. When the voltage across the capacitor 188 exceeds the forward voltage drop of a diode 190 coupled from a point between the capacitor 188 and the movable slide 187 of the variable resistor 186 to a gate electrode 192 of the SCR 180, the diode 190 will pass a positive control voltage to the SCR 180, causing the SCR to turn "on" and pass half-wave-rectified power to the charging capacitor 170. A diode 194 provides discharge of the capacitor 188 during the negative-going portion of the AC input signal cycle on the terminal 140. The parallel combination of a resistor 196 and capacitor 198 is coupled between the gate 192 and the output electrode of the silicon-control rectifier 180 in order to keep the voltage on the gate 192 and the injector of the SCR 180 somewhat higher than the output electrode voltage of the SCR when the diode 190 is conductive.

The circuitry for welding current has the object of placing the proper charge on a weld current charge-storage capacitor 270, one plate of which is directly coupled to the power supply reference terminal 142 while the other plate is directly coupled to the movable contact of the switch 158. When the movable contact of the switch 158 is switched to a first pole 272, the charge-storage capacitor 270 is charged. When the movable contact of the switch 256 is switched to the pole 274 due to actuation of the solenoid 150, the voltage of the charge-storage capacitor 270 is impressed between the wire holder 72 and the grippers 54–56, ready to cause an arc therebetween when the wire 50 approaches near enough to the large workpiece 52. A voltmeter 276 is connected in parallel with the capacitor 270 in order to facilitate adjustment of the charge stored in the capacitor 270 to the proper level for any particular percussive welding operation. A bleeder resistor 278 is also coupled in parallel with the capacitor 270; the function of the bleeder resistor 278 is to dissipate the charge on the capacitor 270 at certain times in the operating cycle.

As an important advance due to the instant invention, the capacitor 270 is charged much faster than was possible in the prior art by an SCR 280 entirely separate from the percussion capacitor SCR and connected between the power input terminal 140 and the pole 272 of the switch 158. A resistor 282 is coupled in parallel with the switch 158 to provide that even when the movable contact of the switch 158 is not closed to the pole 272 some current will flow through the silicon-control rectifier 280 to keep it conductive during the discharge period of the capacitor 270. Gating of the SCR 280 is accomplished similarly to the percussion capacitor SCR 180 by a time constant circuit comprising a fixed resistor 284, a variable resistor 286 (operated by the knob 287 on the front of the handset 10) and a capacitor 288 coupled in series across the SCR 280. When the SCR 280 is "cut-off" or non-conductive, the capacitor 288 charges through the resistors 284 and 286, at a rate variable by varying the position of the slide 287 on the variable resistor 286. When the voltage across the capacitor 288 exceeds the forward voltage drop of a diode 290 coupled from a point between the capacitor 288 and the movable slide 287 of the variable resistor 286 to a gate electrode 292 of the SCR 280, the diode 290 will pass a positive control voltage to the injector of the SCR 280, causing it to turn "on" and pass half-wave rectified power to the charging capacitor 270. A diode 294 provides for discharge of the capacitor 288 during the negative-going portion of the AC input signal cycle on the terminal 140. The parallel combination of a resistor 296 and capacitor 298 is coupled between the gate 292 and the output electrode of the silicon-control rectifier 280 in order to keep the voltage on the gate 292 somewhat higher than the output electrode voltage when the diode 290 is conductive.

As another feature of the invention, a few turns of heavy wire 300 of low resistance may be inserted in series with the wire holder 72 (i.e. in the weld circuit) and an armature-pointer 302 mounted to be impelled by the solenoid action of the wire 300 when the weld current passes through. A cooperating weld pulse monitor 304 with a high-level marker 306 will then provide an extra aid to fine adjustment of applicant's new welding system.

A circuit according to FIGURE 6 was built and operated using the following components.

Power supply:
140'142 _____ 117 volt, 60-cycle AC
140–142 _____ 117 volt, 60-cycle AC Diodes:
180 _____ C15B
190 _____ 1N1693
194 _____ 1N1695
280 _____ C15B
290 _____ 1N1693
294 _____ 1N1695

Resistors: ohms
146 _____ 10K
148 _____ 22K
178 _____ 10K
182 _____ 300
184 _____ 100
186 (variable) _____ 10K
196 _____ 1K
278 _____ 10K
282 _____ 300
284 _____ 100
286 (variable) _____ 10K
296 _____ 1K Capacitors: microfarads
150 _____ 80
170 _____ 700
188 _____ 1.0
198 _____ 1.0
270 _____ 5,000
288 _____ 1.0
298 _____ 1.0

Thus, the principles of the instant invention provide new electronic circuitry both for actuating the percussion solenoid 92 and for supplying weld current in the performance of percussion welding. Solenoid current and weld current are supplied by two entirely separate capacitors 170 and 270, each of which can be separately monitored as by the voltmeters 176 and 276 and also separately adjusted as by the continuously variable potentiometers 186 and 286, a great improvement over the five-or-six-position step switches heretofore used. Due to the introduction of the charging circuits associated with each charge-storage capacitor, instantaneous charge and continuous and independent fine adjustment of the charge can be accomplished rather than mere weld current step-switch adjustment capable of providing only five or six charge levels. Further contribution to the fine adjustment of the electronic circuitry is made by the weld current monitor system 300–306 and also by the solenoid travel adjustment screw 120. The cumulative result of all these new features is the extension of percussive welding to many different materials and material sizes that were heretofore considered unweldable, the above-cited example of copper-to-tungsten welding being only one. Also, the separate adjustability of percussion travel and percussion current pulse makes it possible to search for a combination of the two where hot metal splatter can be minimized or avoided, if the independently variable weld current is likewise placed at an optimum point.

In addition to the above-discussed extensions of welding technology, manufacturing ease and speed is also increased throughout applicant's welding system. The SCR charging circuits, for example, are almost instantaneous in their action and thus permit far faster recycling of the welding equipment than can ever be achieved by the heretofore-known transformer, potentiometer, and other such setups. Also of help in increasing production rates is the new and direct method of properly setting the gap between the workpieces to be percussion welded, whereby the actuation of the solenoid 92 cannot take place until the trigger has pulled it back to create the desired gap length, i.e.—in contact with the microswitch 114 which the operator has gap-length adjusted with the wheel 122. Once the gap adjustment is proper, all the operator of applicant's welding system need do is to let the workpieces 50 and 52 begin the cycle in contact with each other, and proper gapping will be certain to ensue. This development, of course, not only decreases the amount of operator skill required to use the welder, but also makes the insertion of the workpieces in the welding gun a very fast and simple process.

The welding system according to the invention has even more new features associated with the gun 12 that make it a great improvement over what was heretofore known. In addition to the trigger-supplied automatic gapping mentioned above, the same trigger motion serves to close the grippers on the large workpiece and initiate the entire electronic cycle necessary to perform the weld. Thus, the operator need only hold the gun 12 in his right hand and insert workpieces at the front with his left hand. In the production process there will be no need to put the gun down and then pick it up again or any other time-consuming fumbling with the workpieces, grippers, wire holders, trigger, or the like. Even the opening and closing of the wire holder can be performed without shifting the gun or even removing the index finger from the trigger, due to applicant's provision of the slide 130 in exactly the right position for being moved back and forth by the right-hand thumb of the operator. The result is that the gun 12 can be held continuously in the right hand of the operator while first the wire holder 72 and then the grippers 54–56 have workpieces properly inserted by the operator's left hand.

In summary, therefore, the broad achievement of the instant invention is a percussion welding system that simultaneously provides quicker production rates and finer welding performance. At the same time, the cost of the power supply and electronics have been greatly cut down by the elimination of transformers and other large components, yet the reliability and recycling speed of the new electronic circuitry is far superior and the fine-control potentialities are far greater than was true of the electronics that the invention supersedes. Accordingly, the electronics according to the instant invention and the new gun together form an inexpensive light and compact welding system that can be used by realtively unskilled operators and still perform welding feats otherwise unattainable.

Although the invention has been described in its preferred form with a certain degree of particularity, it should be understood that the present disclosure of the preferred form has been made only by way of example

What is claimed is:

1. A percussion-welding hand gun for percussion welding a length of wire to a workpiece while being held in one hand by the operator thereof, comprising:

an outer shell adapted to be gripped in one hand by the operator;

a trigger mounted to slide over a certain length of travel relative to the outer shell;

a fixed gripper mounted on the outer shell;

a movable gripper mounted to pivot relative to the outer shell and adapted to cooperate with the fixed gripper to hold the workpiece during the welding operation;

means mechanically connected between the trigger and the movable gripper in such manner that movement of the trigger by the operator of the hand gun will cause movement of the movable gripper;

a percussion solenoid having a winding and a movable armature with first and second ends mounted within the outer shell in such manner as to be movable therein;

means associated with the trigger and adapted to interact with the percussion solenoid to move it in a direction away from the grippers when the trigger is actuated by the operator of the gun;

a fixed wire holding jaw mounted on the end of the percussion-solenoid armature nearest the grippers;

a movable wire holding jaw pivotally mounted to the fixed wire holding jaw;

a wire-holder shank mounted to the movable wire holding jaw;

a wire-holder latch pivotally mounted to the fixed wire holding jaw and adapted to interact with the wire-holder shank in such manner that manual operation of the wire-holder latch by the operator of the hand gun can cause the movable wire holding jaw to be closed to cooperate with the fixed wire holding jaw to hold wire and alternatively opened to permit the insertion and positioning of wire; and an electrical switch mounted within the outer shell of the hand gun and positioned relative to the percussion solenoid in such manner that when the percussion solenoid is moved over a certain distance it will cause the electrical switch to produce a weld sequence electrical signal.

2. A percussion-welding hand gun for percussion welding a length of wire to a workpiece while being held in one hand by the operator thereof, comprising:

an outer shell adapted to be gripped in one hand by the operator;

a trigger mounted to slide over a certain length of travel relative to the outer shell;

a fixed gripper mounted on the outer shell;

a movable gripper mounted pivotally to the outer shell and adapted to pivot relative to the outer shell and to cooperate with the fixed gripper to hold the workpiece during the welding operation;

a percussion selenoid having a winding and a movable armature having first and second ends and slidably mounted within the outer shell and adapted to be moved relative to the outer shell when the trigger is manipulated;

a fixed wire holding jaw mounted on the end of the percussion-solenoid armature nearest the grippers;

a movable wire holding jaw pivotally mounted to the fixed wire holding jaw;

an electrical switch mounted within the outer shell of the hand gun and positioned relative to the percussion solenoid in such manner that when the percussion solenoid is moved by actuation of the trigger over a certain distance it will cause the electrical switch to produce a weld sequence electrical signal;

first charge-storage means switchably connected to apply the charge stored therein across the grippers and the wire holding jaws;

second charge-storage means switchably connected to apply the charge stored therein to the percussion solenoid;

a source of power; and switching means electrically connected to the source of power and also switchably electrically connected to the first and second charge-storage means and adapted to supply current from the source of power for charging the first and second charge-storage means.

3. A welding system for the performance of percussion welding by an operator to unite a first workpiece with a second workpiece, comprising:

first holding means adapted for holding the first workpiece;

second holding means adapted for holding the second workpiece;

first charge-storage means having first and second terminals, the first terminal of the first charge-storage means being electrically connected to the first workpiece holding means;

first switching means electrically connected to the first charge-storage means and having first and second modes, the first mode of the first switching means being such that the second terminal of the first charge-storage means is electrically connected to the second workpiece holding means;

second switching means electrically connected to the first switching means in such manner that when the first switching means is in its second mode, the second switching means is connected to the second terminal of the first charge-storage means;

a source of power electrically connected to the second switching means;

means operatively associated with the second switching means for causing said second switching means to apply power from the source of power to the first charge-storage means until the first charge-storage means is charged to a certain level;

electrical percussion actuation means having first and second terminals and being adapted to impart percussion welding motion to one of the workpiece holding means;

a second charge-storage means having first and second terminals, the first terminal of the second charge-storage means being connected to the first terminal of the electrical percussion actuation means;

third switching means electrically connected to the second terminal of the second charge-storage means and having first and second modes, the first mode of the third switching means being such that charge stored in the second charge-storage means is applied across the first and second terminals of the electrical percussion actuation means;

fourth switching means electrically connected to the third switching means in such manner that in the second mode of the third switching means the fourth switching means is electrically connected with the second terminal of the second charge-storage means, the fourth switching means being also connected to the power supply;

means associated with the fourth switching means for causing the fourth switching means to pass electrical power to the second charge-storage means until the second charge-storage means is charged to a certain level;

cocking means for moving the first holding means and the second holding means away from each other by a certain distance prior to operation of the percussion actuation means; and means adapted to be actuated by the operator of the welding system for first activating the cocking means and thereafter switching the first and third switching means between their first and second modes.

4. In combination for the performance of percussion welding by an operator to unite a first workpiece with a second workpiece:
first and second holding means adapted for holding the first workpiece;
third and fourth holding means adapted for holding the second workpiece;
electrical percussion-actuation means having first and second terminals and being operatively connected with the first and second holding means and adapted to impel the workpiece held by the first and second holding means toward the workpiece held by the third and fourth holding means;
first charge-storage means having first and second terminals, the first terminal of the first charge-storage means being electrically connected to the workpiece held the by first and second workpiece holding means;
first switching means electrically connected to the first charge-storage means and having first and second modes, the first mode of the first switching means being such that the second terminal of the first charge-storage means is electrically connected to pass current to the workpiece held by the third and fourth workpiece holding means:
second switching means electrically connected to the first switching means in such manner that when the first switching means it in its second mode, the second switching means is connected to pass current to the second terminal of the charge-storage means;
a source of power electrically connected to the second switching means;
means operatively associated with the second switching means for causing said second switching means to apply power from the source of power to pass current to the first charge-storage means until the first charge-storage means is charged to a certain level;
a second charge-storage means having first and second terminals, the first terminal of the second charge-storage means being connected to the first terminal of the electrical percussion-actuation means;
third switching means electricaly connected to the second terminal of the second charge-storage means and having first and second modes, the first mode of the third switching means being such that charge stored in the second charge-storage means is applied across the first and second terminals of the electrical percussion means;
fourth switching means electrically connected to the third switching means in such manner that in the second mode of the third switching means the fourth switching means is electrically connected with the second terminal of the second charge-storage means, the fourth switching means being also connected to the power supply;
means associated with the fourth switching means for causing the fourth switching means to pass electrical power to the second charge-storage means until the second charge-storage means is charged to a certain level;
means for moving the workpiece held by the first and second holding means and the workpiece held by the third and fourth holding means away from each other by a certain distance prior to operation of the percussion-actuation means; and
means for switching the first and third switching means between their first and second modes.

5. A percussion-welding electrical system comprising:
an alternating current power supply having first and second terminals;
a weld-actuation switch having first and second terminals, the first terminal of the weld-actuation switch being coupled to the first terminal of the power supply;
a weld-actuation solenoid having an armature and a winding, the winding having first and second ends, the first end of the winding being coupled to the second terminal of the weld-actuation switch;
a first charge-storage capacitor coupled in parallel with the series combination of the weld-actuation switch and the weld-actuation solenoid;
the series combination of a first diode, a first resistor and a second resistor coupled between the second terminal of the power supply and ground, the second end of the weld-actuation solenoid being coupled to a point between the first resistor and the second resistor;
a percussion solenoid having a winding and an armature, the winding of the percussion solenoid having first and second ends, the first end of the winding of the percussion solenoid being coupled to the first terminal of the power supply;
a percussion-solenoid switch having a movable contact and first and second poles, the first pole of the percussion-solenoid switch being connected to the second to the second end of the percussion-solenoid winding;
a percussion-solenoid charge-storage capacitor having first and second plates, the first plate of the percussion-solenoid charge-storage capacitor being connected to the movable contact of the percussion-solenoid switch and the second plate of the percussion-solenoid charge-storage capacitor being connected to the first terminal of the power supply;
a first bleeder resistor coupled in parallel with the percussion-solenoid charge-storage capacitor;
a first voltmeter coupled in parallel with the percussion-solenoid charge-storage capacitor;
a third resistor connected between the movable contact of the percussion-solenoid switch and the second pole of the percussion-solenoid switch;
a first silicon-control rectifier having input and output electrodes and a gate signal electrode, the output electrode of the silicon-control rectifier being directly coupled to the second pole of the percussion-solenoid actuation switch and the input electrode of the first silicon-control rectifier being directly coupled to the second terminal of the power supply;
the series combination of a fourth resistor, a first variable resistor and a first capacitor coupled between the input and output electrodes of the silicon-control rectifier;
a second diode coupled from a point between the first capacitor and the first variable resistor to the gate signal electrode of the first silicon-control rectifier;
a third diode coupled from a point between the first capacitor and the first variable resistor to the second power supply terminal;
the parallel combination of a fifth resistor and a second capacitor coupled between the output electrode of the first silicon-control rectifier and the gate signal electrode of the first silicon-control rectifier;
a first welding electrode directly connected to the first power supply terminal;
a second welding electrode mounted on the percussion-solenoid armature;
a weld-current switch mechanically connected to be actuated by the armature of the weld-actuation solenoid, the weld-current switch having first and second poles and a movable contact, the first pole of the weld-current switch being directly connected to the second welding electrode;
a weld-current charge-storage capacitor having first and second plates, the first plate of the weld-current charge-storage capacitor being directly connected to the first terminal of the power supply and the second plate of the weld-current charge-storage capacitor being directly connected to the movable contact of the weld-current switch;

a second bleeder resistor coupled in parallel with the weld-current charge-storage capacitor;

a second voltmeter coupled in parallel with the weld-current charge-storage capacitor;

a sixth resistor connected between the movable contact of the weld-current switch and the second pole of the weld-current switch;

a second silicon-control rectifier having input, output and control electrodes, the output electrode of the silicon-control rectifier being connected to the second pole of the weld-current switch and the input electrode of the silicon-control rectifier being connected to the second terminal of the power supply;

the parallel combination of the seventh resistor and a third capacitor connected between the output electrode of the second silicon-control rectifier and the control electrode of the second silicon-control rectifier;

a fourth capacitor having first and second plates, the first plate of the fourth capacitor being connected to the output electrode of the second silicon-control rectifier;

a fourth diode connected between the second plate of the second timing capacitor and the control electrode of the second silicon-control rectifier;

a fifth diode connected between the second plate of the second timing capacitor and the second terminal of the power supply;

an eighth resistor having first and second ends, the first end of the eighth resistor being connected to the second terminal of the power supply; and a variable resistor having an input terminal and a movable slide, the input terminal of the variable resistor being connected to the second end of the resistor and the movable slide being connected to the second plate of the fourth capacitor.

6. In combination for performing percussion welding:

first and second workpiece holding means;

first charge-storage means having first and second terminals, the first terminal of the first charge-storage means being electrically connected to the first workpiece holding means;

first switching means electrically connected to the first charge-storage means and having first and second modes, the first mode of the first switching means being such that the second terminal of the first charge-storage means is electrically connected to the second workpiece holding means;

second switching means electrically connected to the first switching means in such manner that when the first switching means is in its second mode, the second switching means is connected to the second terminal of the charge-storage means;

a source of power electrically connected to the second switching means;

means operatively associated with the second switching means for causing said second switching means to apply power from the source of power to the first charge-storage means until the first charge-storage means is charged to a certain level;

electrical percussion means having first and second terminals and being adapted to impart percussion welding motion to one of the workpiece holding means;

a second charge-storage means having first and second terminals, the first terminal of the second charge-storage means being connected to the first terminal of the electrical percussion means;

third switching means electrically connected to the second terminal of the second charge-storage means and having first and second modes, the first mode of the third switching means being such that charge stored in the second charge-storage means is applied across the first and second terminals of the electrical percussion means;

fourth switching means electrically connected to the third switching means in such manner that in the second mode of the third switching means the fourth switching means is electrically connected with the second terminal of the second charge-storage means, the fourth switching means being also connected to the power supply;

means associated with the fourth switching means for causing the fourth switching means to pass electrical power to the second charge-storage means until the second charge-storage means is charged to a certain level; and means for switching the first and third switching means between their first and second modes.

7. A percussion-welding electrical system comprising:

a weld-actuation switch having first and second terminals;

a weld-actuation solenoid having an armature and a winding having first and second ends, the first end of the weld-actuation solenoid winding being coupled to the first terminal of the weld-actuation switch;

a first charge-storage capacitor coupled in parallel with the series combination of the weld-actuation switch and the weld-actuation solenoid;

a power supply;

means electrically connected between the power supply and the first charge-storage capacitor for supplying charge to the first charge-storage capacitor;

a percussion solenoid having a winding and an armature, the winding of the percussion solenoid having first and second ends;

a percussion-solenoid switch having a movable contact mechanically connected to be moved by the armature of the weld-actuation solenoid and having first and second poles, the first pole of the percussion-solenoid switch being connected to the first end of the percussion-solenoid winding;

a percussion-solenoid charge-storage capacitor having first and second plates, the first plate of the percussion-solenoid charge-storage capacitor being connected to the movable contact of the percussion-solenoid switch and the second plate of the percussion-solenoid charge-storage capacitor being coupled to the second end of the percussion-solenoid winding;

a first silicon-control rectifier having conductive and non-conductive states and also having input and output electrodes, the output electrode of the silicon-control rectifier being directly coupled to the second pole of the percussion-solenoid switch and the input electrode of the first silicon-control rectifier being directly coupled to the power supply;

means electrically connected to the first silicon-control rectifier for switching the first silicon-control rectifier into its conductive state until the percussion-solenoid charge-storage capacitor is charged to a certain level;

first and second welding electrodes;

a weld-current switch mechanically connected to be actuated by the armature of the weld-actuation solenoid, the weld-current switch having first and second poles and a movable contact, the first pole of the weld-current switch being directly connected to the first welding electrode;

a weld-current charge-storage capacitor having first and second plates, the first plate of the weld-current charge-storage capacitor being directly connected to the second welding electrode and the second plate of the weld-current charge-storage capacitor being directly connected to the movable contact of the weld-current switch;

a second silicon-control rectifier having conductive and non-conductive states and having input and output electrodes, the output electrode of the silicon-control rectifier being connected to the second pole of the weld-current switch and the input electrode of the silicon-control rectifier being connected to the power supply; and means electrically connected to the second silicon-control rectifier for switching the second silicon-control rectifier into its conductive state until the weld-current charge-storage capacitor is charged to a certain level.

8. A percussion-welding hand gun for percussion welding a length of wire to a workpiece while being held in one hand by the operator thereof, comprising:

an outer shell adapted to be gripped in one hand by the operator;

a trigger mounted to slide over a certain length of travel relative to the outer shell;

a trigger spring for urging the trigger to one extreme of its length of travel;

a fixed gripper mounted on the outer shell;

a movable gripper mounted to pivot relative to the outer shell and adapted to cooperate with the fixed gripper to hold the workpiece during the welding operation;

a cam surface on the movable gripper;

a cam roller movably mounted to cooperate with the cam surface to move the movable gripper relative to the fixed gripper;

a cam roller shaft mounted between the cam roller and the trigger in such manner that movement of the trigger against the trigger spring will cause the cam roller to cooperate with the movable gripper cam to move the movable gripper;

a gripper spring mounted between the movable gripper and the outer shell and adapted to urge the movable gripper against the cam roller;

a percussion solenoid having a winding and a movable armature mounted within the outer shell in such manner as to be movable therein;

an armature spring connected to the movable armature and adapted to yieldingly urge the armature away from the grippers;

a first ear on the trigger adapted to interact with the percussion solenoid to move it in a direction away from the grippers when the trigger is actuated by the operator of the gun;

a second ear on the trigger adapted to interact with the percussion solenoid to move it forward toward the grippers when the trigger is moved by the trigger spring;

a fixed wire holding jaw mounted on the end of the percussion-solenoid armature nearest the grippers;

a movable wire holding jaw pivotally mounted to the fixed wire holding jaw;

a wire-holder shank mounted to the movable wire holding jaw;

a wire-holder latch pivotally mounted to the fixed wire holding jaw and adapted to interact with the wire-holder shank in such manner that manual operation of the wire-holder latch by the operator of the hand gun can cause the movable wire holding jaw to be closed to cooperate with the fixed wire holding jaw to hold wire and alternatively opened to permit the insertion and positioning of wire;

an electrical switch mounted within the outer shell of the hand gun and positioned relative to the percussion solenoid in such manner that when the percussion solenoid is moved by actuation of the trigger over a certain distance it will cause the electrical switch to produce a weld sequence electrical signal;

electrical leads electrically connected to the electrical switch and adapted for carrying signals from the electrical switch outside the hand gun;

an adjusting screw for shifting the position of the electrical switch relative to the percussion solenoid in such manner that the distance through which the percussion solenoid travels before causing the electrical switch to produce the weld sequence signal can be varied;

percussion-solenoid leads electrically connected to the percussion solenoid and adapted to carry actuation signals thereto from outside the hand gun;

a first weld lead electrically connected to the fixed gripper and the movable gripper and adapted to carry electrical signals thereto from a point outside the hand gun; and a second weld lead electrically connected to the fixed wire holding jaw and the movable wire holding jaw and adapted to carry electrical signals thereto from a point outside the hand gun.

9. The percussion-wilding device described in claim 8 with the added characterization of:

a latch slide mounted movably on the outside of the hand gun in such position as to be manipulable by the operator of the gun using the same hand that is holding the gun and adapted to move the wire-holder latch to produce opening and closing of the movable wire-holding jaw.

10. The percussion-welding apparatus described in claim 8 additionally characterized in that the fixed wire-holding jaw and the movable wire-holding jaw have cooperating gripping surfaces for gripping wire between them, and that the gripping surface of the fixed wire-holding jaw is substantially an enclosure with only a space left for insertion of the wire, and that the gripping surface of the movable wire-holding jaw is shaped to fill the space left in the gripping surface of the fixed wire-holding jaw whenever the movable wire-holding jaw has been closed to the fixed wire-holding jaw.

References Cited

UNITED STATES PATENTS

| | | | |
|---|---|---|---|
| 2,472,041 | 5/1949 | Davies | 219—110 |
| 2,878,362 | 3/1959 | Quinlan | 219—95 X |
| 2,921,177 | 1/1960 | Gellatly et al. | 219—95 |
| 3,244,854 | 4/1966 | Bucci et al. | 219—98 |

RICHARD M. WOOD, *Primary Examiner.*

C. CHADD, *Assistant Examiner.*